US012230207B2

(12) United States Patent
Lee et al.

(10) Patent No.: US 12,230,207 B2
(45) Date of Patent: Feb. 18, 2025

(54) PIXEL OF A DISPLAY DEVICE, AND DISPLAY DEVICE

(71) Applicant: Samsung Display Co., LTD., Yongin-si (KR)

(72) Inventors: Sang-Myoung Lee, Yongin-si (KR); Sanghyun Kang, Yongin-si (KR); Subin Park, Yongin-si (KR); Joosun Yoon, Yongin-si (KR); Minseong Yi, Yongin-si (KR); Seonghyun Jin, Yongin-si (KR); Joon Huh, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/490,834

(22) Filed: Oct. 20, 2023

(65) Prior Publication Data

US 2024/0249683 A1 Jul. 25, 2024

(30) Foreign Application Priority Data

Jan. 20, 2023 (KR) ........................ 10-2023-0009017

(51) Int. Cl.
*G09G 3/3233* (2016.01)

(52) U.S. Cl.
CPC ... *G09G 3/3233* (2013.01); *G09G 2300/0842* (2013.01); *G09G 2310/0278* (2013.01); *G09G 2320/02* (2013.01)

(58) Field of Classification Search
CPC ......... G09G 3/3233; G09G 2300/0842; G09G 2320/02; G09G 2310/0278
See application file for complete search history.

(56) References Cited

U.S. PATENT DOCUMENTS

2016/0104424 A1* 4/2016 Lim ..................... G09G 3/3233 345/76
2024/0169921 A1* 5/2024 Lee ...................... G09G 3/3233

FOREIGN PATENT DOCUMENTS

| | | |
|---|---|---|
| KR | 10-2017-0081082 | 7/2017 |
| KR | 10-1937768 | 1/2019 |
| KR | 10-2020-0076012 | 6/2020 |
| KR | 10-2021-0050626 | 5/2021 |
| KR | 10-2022-0062185 | 5/2022 |
| KR | 10-2022-0125909 | 9/2022 |

* cited by examiner

*Primary Examiner* — Hang Lin
(74) *Attorney, Agent, or Firm* — KILE PARK REED & HOUTTEMAN PLLC

(57) ABSTRACT

A pixel of a display device includes a first transistor including a gate connected to a first node, a first terminal, and a second terminal connected to a second node, a first storage capacitor connected between the first node and the second node, a second storage capacitor connected between the first node and the second node, a second transistor including a gate connected to the first node, a first terminal, and a second terminal connected to the first node, a third transistor, a fourth transistor, a fifth transistor, a sixth transistor including a gate receiving an emission signal, a first terminal connected to a line of a first power supply voltage, and a second terminal connected to the first terminal of the first transistor, and a light emitting element including an anode connected to the second node, and a cathode connected to a line of a second power supply voltage.

20 Claims, 11 Drawing Sheets

PIXEL OF A DISPLAY DEVICE, AND DISPLAY DEVICE

CROSS-REFERENCE TO RELATED APPLICATION(S)

This application claims priority to and benefits of Korean Patent Application No. 10-2023-0009017 under 35 USC § 119, filed on Jan. 20, 2023 in the Korean Intellectual Property Office, the entire contents of which are incorporated herein by reference.

BACKGROUND

1. Technical Field

Embodiments relate to a display device, and a pixel of a display device, and the display device.

2. Description of the Related Art

A pixel of a display device may include a storage capacitor, a scan transistor that transfers a data voltage to the storage capacitor in response to a scan signal (or a writing signal), a driving transistor that generates a driving current based on the data voltage stored in the storage capacitor, and a light emitting element that emits light based on the driving current generated by the driving transistor.

However, at an edge (for example, a falling edge) of the scan signal at which the scan signal is changed from an on-level to an off-level, by a parasitic capacitor between a line of the scan signal and a gate node of the driving transistor, a kickback phenomenon where a voltage of the gate node of the driving transistor is changed (for example, decreased) by a kickback voltage may occur. Further, by this kickback phenomenon, a luminance deviation between a center portion and a peripheral portion of a display panel may occur.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

An embodiment provides a pixel of a display device having an improved image quality.

An embodiment provides a display device having an improved image quality.

The technical objectives to be achieved by the disclosure are not limited to those described herein, and other technical objectives that are not mentioned herein would be clearly understood by a person skilled in the art from the description of the disclosure.

According to embodiments, a pixel of a display device may include a first transistor including a gate electrically connected to a first node, a first terminal, and a second terminal electrically connected to a second node; a first storage capacitor electrically connected between the first node and the second node; a second storage capacitor electrically connected between the first node and the second node; a holding capacitor electrically connected between a line of a first power supply voltage and the second node; a second transistor including a gate electrically connected to the first node, a first terminal, and a second terminal electrically connected to the first node; a third transistor including a gate receiving a writing signal, a first terminal electrically connected to a data line, and a second terminal electrically connected to the first node; a fourth transistor including a gate receiving a reset signal, a first terminal electrically connected to a line of a reference voltage, and a second terminal electrically connected to the first node; a fifth transistor including a gate receiving an initialization signal, a first terminal electrically connected to the second node, and a second terminal electrically connected to a line of an initialization voltage; a sixth transistor including a gate receiving an emission signal, a first terminal electrically connected to the line of the first power supply voltage, and a second terminal electrically connected to the first terminal of the first transistor; and a light emitting element including an anode electrically connected to the second node, and a cathode electrically connected to a line of a second power supply voltage.

In embodiments, the first storage capacitor may include a first electrode electrically connected to the first node, and a second electrode electrically connected to the second node. The second storage capacitor may include a third electrode electrically connected to the first node, and a fourth electrode electrically connected to the second node. The third electrode may be different from the first electrode, and the fourth electrode may be different from the second electrode.

In embodiments, the first transistor may further include a bottom gate electrically connected to the second node.

In embodiments, the pixel may further include a seventh transistor including a gate receiving the writing signal, a first terminal electrically connected to the first node, and a second terminal electrically connected to the first terminal of the second transistor.

In embodiments, the pixel may further include an eighth transistor including a gate receiving the emission signal, a first terminal electrically connected to the line of the first power supply voltage, and a second terminal electrically connected to the first terminal of the second transistor.

In embodiments, the first terminal of the second transistor may be electrically connected to the second terminal of the sixth transistor.

In embodiments, the second transistor may further include a bottom gate electrically connected to the second node.

In embodiments, the first through sixth transistors may be n-type metal oxide semiconductor (NMOS) transistors.

In embodiments, the first transistor, the second transistor, the third transistor, the fourth transistor, the fifth transistor and the sixth transistor may be oxide transistors.

In embodiments, a frame period for the display device may include a first period in which the reset signal and the initialization signal have an on-level, and the emission signal and the writing signal have an off-level; a second period in which the emission signal and the reset signal have the on-level, and the initialization signal and the writing signal have the off-level; a third period in which the writing signal has the on-level, and the emission signal, the reset signal and the initialization signal have the off-level; and a fourth period in which the emission signal has the on-level, and, the reset signal, the initialization signal and the writing signal have the off-level.

According to embodiments, a display device mat include a display panel including pixels; a data driver that provides a data voltage to each of the pixels; a scan driver that provides a writing signal, a reset signal and an initialization signal to each of the pixels; an emission driver that provides an emission signal to each of the pixels; and a controller that controls the data driver, the scan driver and the emission driver. Each of the pixels may include a first transistor including a gate electrically connected to a first node, a first terminal, and a second terminal electrically connected to a second node; a first storage capacitor electrically connected between the first node and the second node; a second storage capacitor electrically connected between the first node and the second node; a holding capacitor electrically connected between a line of a first power supply voltage and the second node; a second transistor including a gate electrically connected to the first node, a first terminal, and a second terminal electrically connected to the first node; a third transistor including a gate receiving the writing signal, a first terminal electrically connected to a data line, and a second terminal electrically connected to the first node; a fourth transistor including a gate receiving the reset signal, a first terminal electrically connected to a line of a reference voltage, and a second terminal electrically connected to the first node; a fifth transistor including a gate receiving the initialization signal, a first terminal electrically connected to the second node, and a second terminal electrically connected to a line of an initialization voltage; a sixth transistor including a gate receiving the emission signal, a first terminal electrically connected to the line of the first power supply voltage, and a second terminal electrically connected to the first terminal of the first transistor; and a light emitting element including an anode electrically connected to the second node, and a cathode electrically connected to a line of a second power supply voltage.

In embodiments, the first storage capacitor may include a first electrode electrically connected to the first node, and a second electrode electrically connected to the second node. The second storage capacitor may include a third electrode electrically connected to the first node, and a fourth electrode electrically connected to the second node. The third electrode may be different from the first electrode, and the fourth electrode may be different from the second electrode.

In embodiments, the first transistor may further include a bottom gate electrically connected to the second node.

In embodiments, each of the pixels may further include a seventh transistor including a gate receiving the writing signal, a first terminal electrically connected to the first node, and a second terminal electrically connected to the first terminal of the second transistor.

In embodiments, each of the pixels may further include an eighth transistor including a gate receiving the emission signal, a first terminal electrically connected to the line of the first power supply voltage, and a second terminal electrically connected to the first terminal of the second transistor.

In embodiments, the first terminal of the second transistor may be electrically connected to the second terminal of the sixth transistor.

In embodiments, the second transistor may further include a bottom gate electrically connected to the second node.

In embodiments, the first transistor, the second transistor, the third transistor, the fourth transistor, the fifth transistor and the sixth transistor may be n-type metal oxide semiconductor (NMOS) transistors.

In embodiments, the first transistor, the second transistor, the third transistor, the fourth transistor, the fifth transistor and the sixth transistor may be oxide transistors.

In embodiments, a frame period for the display device may include a first period in which the reset signal and the initialization signal have an on-level, and the emission signal and the writing signal have an off-level; a second period in which the emission signal and the reset signal have the on-level, and the initialization signal and the writing signal have the off-level; a third period in which the writing signal has the on-level, and the emission signal, the reset signal and the initialization signal have the off-level; and a fourth period in which the emission signal has the on-level, and, the reset signal, the initialization signal and the writing signal have the off-level.

As described above, a pixel of a display device according to embodiments may include first and second storage capacitors coupled (or connected) in parallel between a first node (for example, a gate node) and a second node (for example, a source node), and a second transistor having a gate coupled (or connected) to the first node. In the pixel and the display device according to embodiments, a kickback phenomenon may be reduced, and a luminance change caused by a threshold voltage change may be reduced.

BRIEF DESCRIPTION OF THE DRAWINGS

Illustrative, non-limiting embodiments will be more clearly understood from the following detailed description in conjunction with the accompanying drawings in which.

DETAILED DESCRIPTION OF THE EMBODIMENTS

Figure 1:
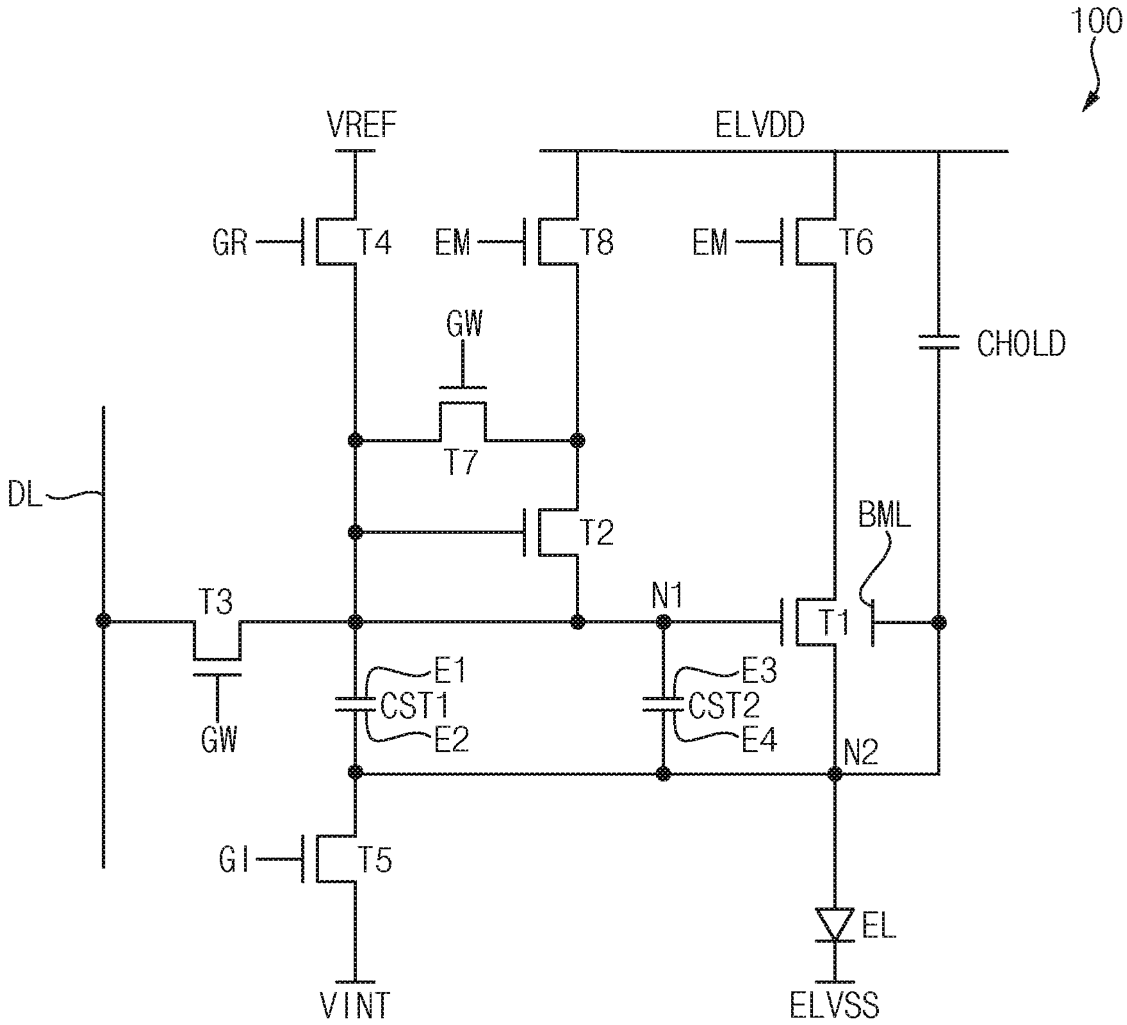
FIG. 1 is a schematic diagram of an equivalent circuit of a pixel of a display device according to embodiments.

The disclosure will now be described more fully hereinafter with reference to the accompanying drawings, in which embodiments are shown. This disclosure may however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, sizes, thicknesses, ratios, and dimensions of the elements may be exaggerated for ease of description and for clarity. Like numbers refer to like elements throughout.

As used herein, the singular forms, “a,” “an,” and “the” are intended to include the plural forms as well, unless the context clearly indicates otherwise.

In the specification and the claims, the term “and/or” is intended to include any combination of the terms “and” and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

It will be further understood that the terms "comprise", "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

Furthermore, in case that a first part such as a layer, a film, a region, or a plate is disposed on a second part, the first part may be not only directly on the second part but a third part or other parts may intervene between them. In addition, when it is expressed that a first part such as a layer, a film, a region, or a plate is formed on a second part, the surface of the second part on which the first part is formed is not limited to an upper surface of the second part but may comprise other surfaces such as a side surface or a lower surface of the second part. To the contrary, in case that a first part such as a layer, a film, a region, or a plate is under or below a second part, the first part may be not only directly under or below the second part but a third part or other parts may intervene between them.

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. The term "overlap" or "overlapped" means that a first object may be above or below or to a side of a second object, and vice versa.

Additionally, the term "overlap" may include layer, stack, face or facing, extending over, covering, or partly covering or any other suitable term as would be appreciated and understood by those of ordinary skill in the art. The expression "not overlap" may include meaning such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It is also to be understood that terms defined in commonly used dictionaries should be interpreted as having meanings consistent with the meanings in the context of the related art, and are expressly defined herein and should not be interpreted in an ideal or overly formal sense unless so defined or implied herein.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

Embodiments may be described and illustrated in the accompanying drawings in terms of functional blocks, units, and/or modules.

Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies.

In the case of the blocks, units, and/or modules being implemented by microprocessors or other similar hardware, they may be programmed and controlled using software (for example, microcode) to perform various functions discussed herein and may optionally be driven by firmware and/or software.

It is also contemplated that each block, unit, and/or module may be implemented by dedicated hardware, or as a combination of dedicated hardware to perform some functions and a processor (for example, one or more programmed microprocessors and associated circuitry) to perform other functions.

Each block, unit, and/or module of embodiments may be physically separated into two or more interacting and discrete blocks, units, and/or modules without departing from the scope of the disclosure.

Further, the blocks, units, and/or modules of embodiments may be physically combined into more complex blocks, units, and/or modules without departing from the scope of the disclosure.

Hereinafter, embodiments will be explained in detail with reference to the accompanying drawings.

FIG. 1 is a schematic diagram of an equivalent circuit of a pixel of a display device according to embodiments.

Referring to FIG. 1, a pixel 100 according to embodiments may include a first transistor T1, a first storage capacitor CST1, a second storage capacitor CST2, a holding capacitor CHOLD, a second transistor T2, a third transistor T3, a fourth transistor T4, a fifth transistor T5, a sixth transistor T6 and a light emitting element EL. In an embodiment, the pixel 100 may further include a seventh transistor T7 and/or an eighth transistor T8. It is to be understood that embodiments may also include more than eight transistors.

The first transistor T1 may generate a driving current based on a data voltage. The first transistor T1 may be referred to as a driving transistor for generating the driving current. In an embodiment, the first transistor T1 may include a gate coupled to a first node N1, a first terminal coupled to the sixth transistor T6, and a second terminal coupled to a second node N2. Here, the first node N1 may be a gate node coupled to the gate of the first transistor T1, and the second node N2 may be a source node coupled to a source of the first transistor T1.

In an embodiment, the gate coupled to the first node N1 may be a top gate located or disposed above an active layer of the first transistor T1, and the first transistor T1 may further include a bottom gate BML located or disposed under or below the active layer and coupled to the second node N2. For example, the first transistor T1 may have a double gate structure including the top gate and the bottom gate BML. In an embodiment, the bottom gate BML of the first transistor T1 may be referred to as a bottom metal layer. Since the bottom gate BML of the first transistor T1 is coupled to the second node N2, and a voltage of the bottom gate BML is held as a constant voltage by the holding capacitor CHOLD, a driving characteristic of the first transistor T1 may be improved.

The first and second storage capacitors CST1 and CST2 may store the data voltage transferred through the third transistor T3 from a data line DL. The first and second storage capacitors CST1 and CST2 may be coupled (or connected) in parallel between the first node N1 and the second node N2. In an embodiment, the first storage capacitor CST1 may include a first electrode E1 coupled to the first node N1, and a second electrode E2 coupled to the second node N2, and the second storage capacitor CST2 may include a third electrode E3 coupled to the first node N1, and a fourth electrode E4 coupled to the second node N2. The third electrode E3 may be different from the first electrode E1, and the fourth electrode E4 may be different from the second electrode E2. In an embodiment, the first electrode E1 and the third electrode E3 may be coupled to the same first node N1, but may be spaced apart from each other. Further, the second electrode E2 and the fourth electrode E4 may be coupled to the same second node N2, but may be spaced apart from each other. In the pixel 100 including the first and second storage capacitors CST1 and CST2 spaced apart from each other, compared with a pixel having only one storage capacitor, a kickback phenomenon at an edge (for example, a falling edge) of a writing signal GW may be reduced, and a threshold voltage compensation operation for the first transistor T1 may be more efficiently performed.

The holding capacitor CHOLD may be a capacitor for holding a voltage of the second node N2. The holding capacitor CHOLD may be coupled between a line of a first power supply voltage ELVDD (for example, a high power supply voltage) and the second node N2. In an embodiment, the holding capacitor CHOLD may include a fifth electrode coupled to the line of the first power supply voltage ELVDD, and a sixth electrode coupled to the second node N2.

The second transistor T2 may be an auxiliary transistor or an auxiliary driving transistor that performs an auxiliary role for the first transistor T1, or the driving transistor. In an embodiment, the second transistor T2 may include a gate coupled to the first node N1, a first terminal coupled to the seventh and eighth transistors T7 and T8, and a second terminal coupled to the first node N1.

The third transistor T3 may apply the data voltage of the data line DL to the first node N1 in response to the writing signal GW. The third transistor T3 may be referred to as a scan transistor for transferring the data voltage. In an embodiment, the third transistor T3 may include a gate receiving the writing signal GW, a first terminal coupled to the data line DL, and a second terminal coupled to the first node N1.

The fourth transistor T4 may apply a reference voltage VREF to the first node N1 in response to a reset signal GR. The fourth transistor T4 may be referred to as a reset transistor for applying the reference voltage VREF to the first node N1. In an embodiment, the fourth transistor T4 may include a gate receiving the reset signal GR, a first terminal coupled to a line of the reference voltage VREF, and a second terminal coupled to the first node N1.

The fifth transistor T5 may apply an initialization voltage VINT to the second node N2 in response to an initialization signal GI. The fifth transistor T5 may be referred to as an initialization transistor for initializing the second node N2. In an embodiment, the fifth transistor T5 may include a gate receiving the initialization signal GI, a first terminal coupled to the second node N2, and a second terminal coupled to a line of the initialization voltage VINT.

The sixth transistor T6 may selectively couple the line of the first power supply voltage ELVDD to the first terminal of the first transistor T1 in response to an emission signal EM. The sixth transistor T6 may be referred to as an emission transistor for forming a path of the driving current from the line of the first power supply voltage ELVDD to a line of a second power supply voltage ELVSS (for example, a low power supply voltage). In an embodiment, the sixth transistor T6 may include a gate receiving the emission signal EM, a first terminal coupled to the line of the first power supply voltage ELVDD, and a second terminal coupled to the first terminal of the first transistor T1.

The seventh transistor T7 may diode-connect the second transistor T2 in response to the writing signal GW. The seventh transistor T7 may be referred to as a compensation transistor for performing a compensation operation for the second transistor T2. In an embodiment, the seventh transistor T7 may include a gate receiving the writing signal GW, a first terminal coupled to the first node N1, and a second terminal coupled to the first terminal of the second transistor T2.

The eighth transistor T8 may selectively couple the line of the first power supply voltage ELVDD to the first terminal of the second transistor T2 in response to an emission signal EM. The eighth transistor T8 also may be referred to as the emission transistor. In an embodiment, the eighth transistor T8 may include a gate receiving the emission signal EM, a first terminal coupled to the line of the first power supply voltage ELVDD, and a second terminal coupled to the first terminal of the second transistor T2.

The light emitting element EL may emit light based on the driving current generated by the first transistor T1. In an embodiment, the light emitting element EL may be, but not limited to, an organic light emitting diode (OLED). In other embodiments, the light emitting element EL may be any suitable light emitting element. For example, the light emitting element EL may be a nano light emitting diode (NED), a quantum dot (QD) light emitting diode, a micro light emitting diode, an inorganic light emitting diode, or any other suitable light emitting element. In an embodiment, the light emitting element EL may include an anode coupled to the second node N2, and a cathode coupled to the line of the second power supply voltage ELVSS.

In an embodiment, as illustrated in FIG. 1, the first through eighth transistors T1 through T8 may be, but not limited to, n-type metal oxide semiconductor (NMOS) transistors. In other embodiments, a portion or all of the first through eighth transistors T1 through T8 may be p-type metal oxide semiconductor (PMOS) transistors. Further, in an embodiment, the first through eighth transistors T1 through T8 may be oxide transistors that have high mobility compared with amorphous silicon transistors. Where the pixel 100 may include only the oxide transistors, the pixel 100 may be referred to as an all oxide pixel.

As described above, the pixel 100 of a display device according to embodiments may include the first and second storage capacitors CST1 and CST2 coupled (or connected) in parallel between the first node N1 and the second node N2, and the second transistor T2 having the gate coupled (or connected) to the first node N1. By the first and second storage capacitors CST1 and CST2 and the second transistor T2, a kickback phenomenon caused by a parasitic capacitor between a line of the writing signal GW and the first node N1 may be reduced, and a luminance change caused by a threshold voltage change may be reduced.

Figure 2:
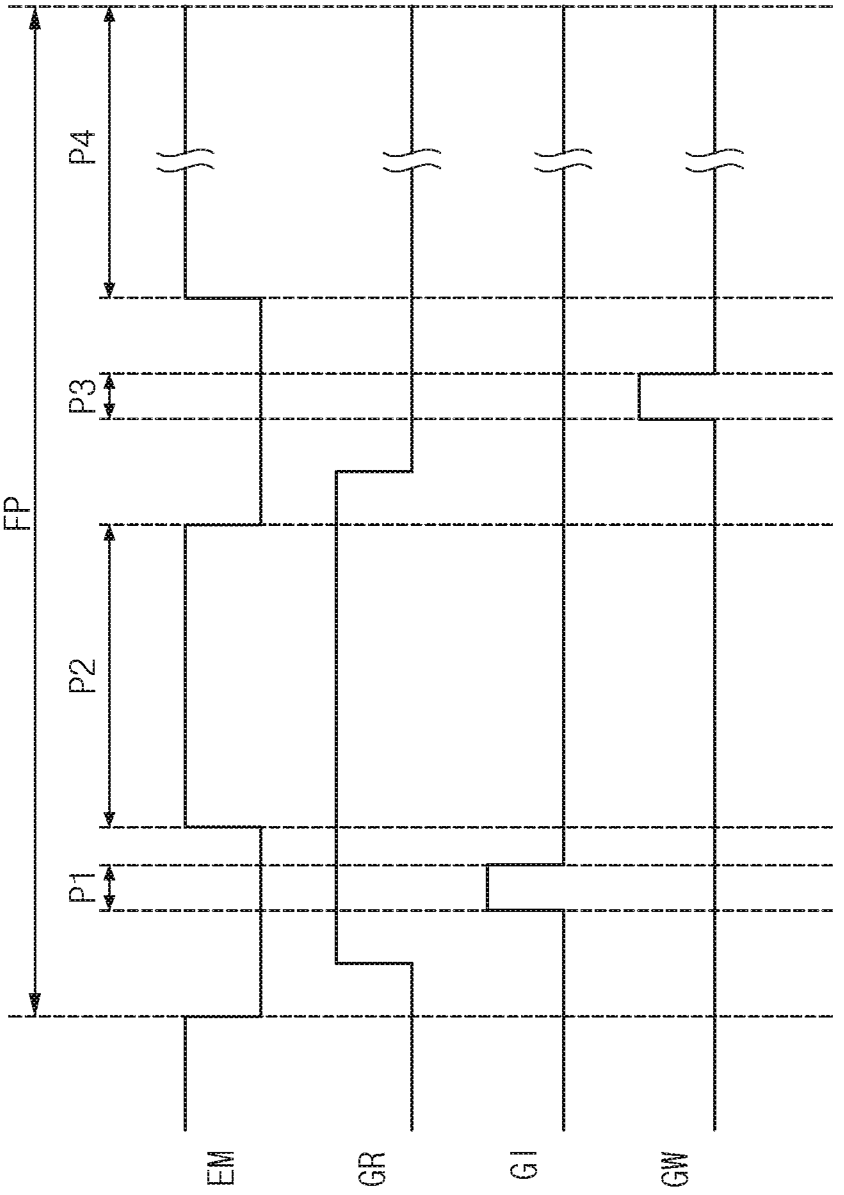
FIG. 2 is a timing diagram for describing an example of an operation of a pixel according to embodiments.
Figure 3:
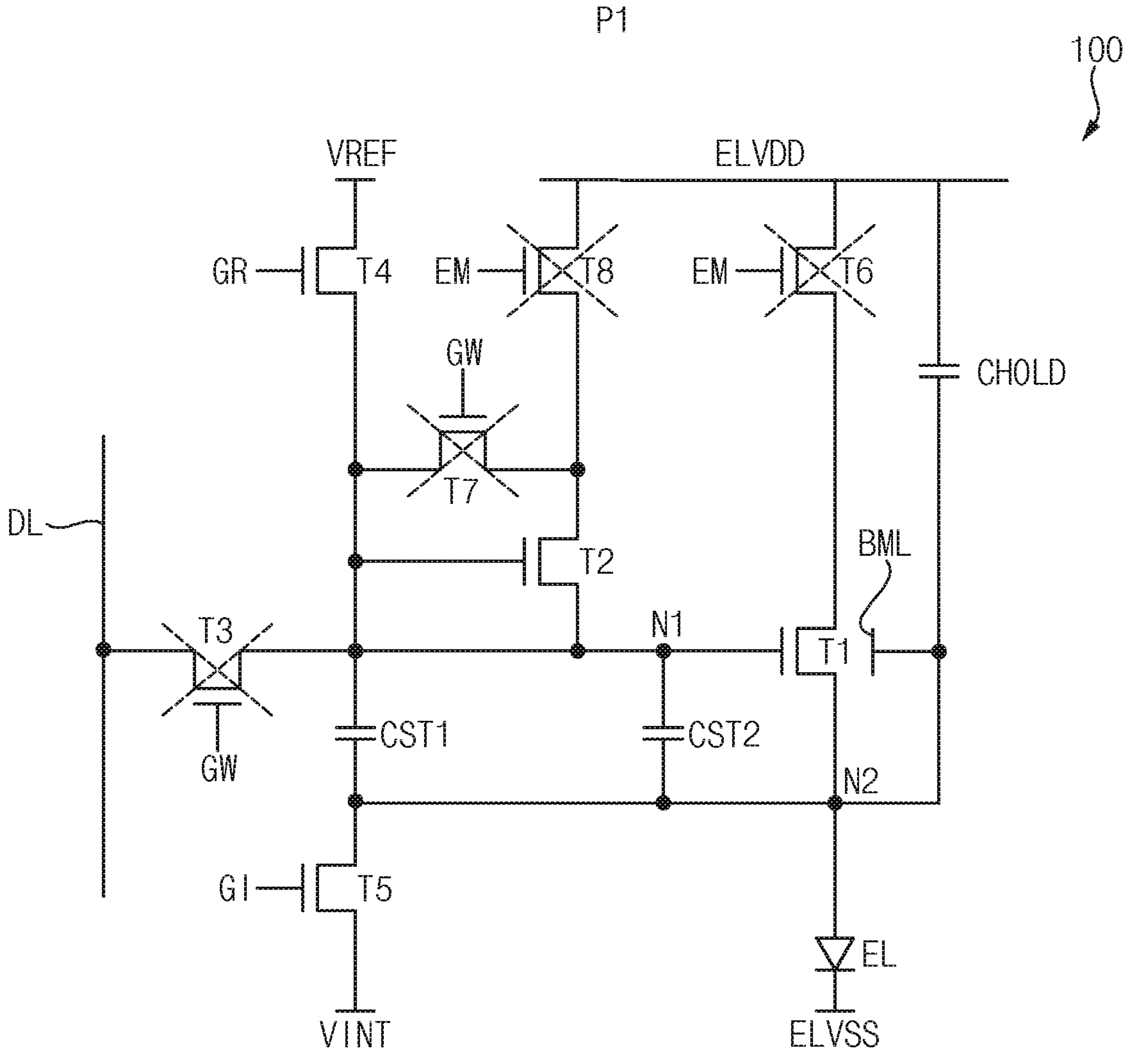
FIG. 3 is a schematic circuit diagram for describing an example of an operation of a pixel in a first period.
Figure 4:
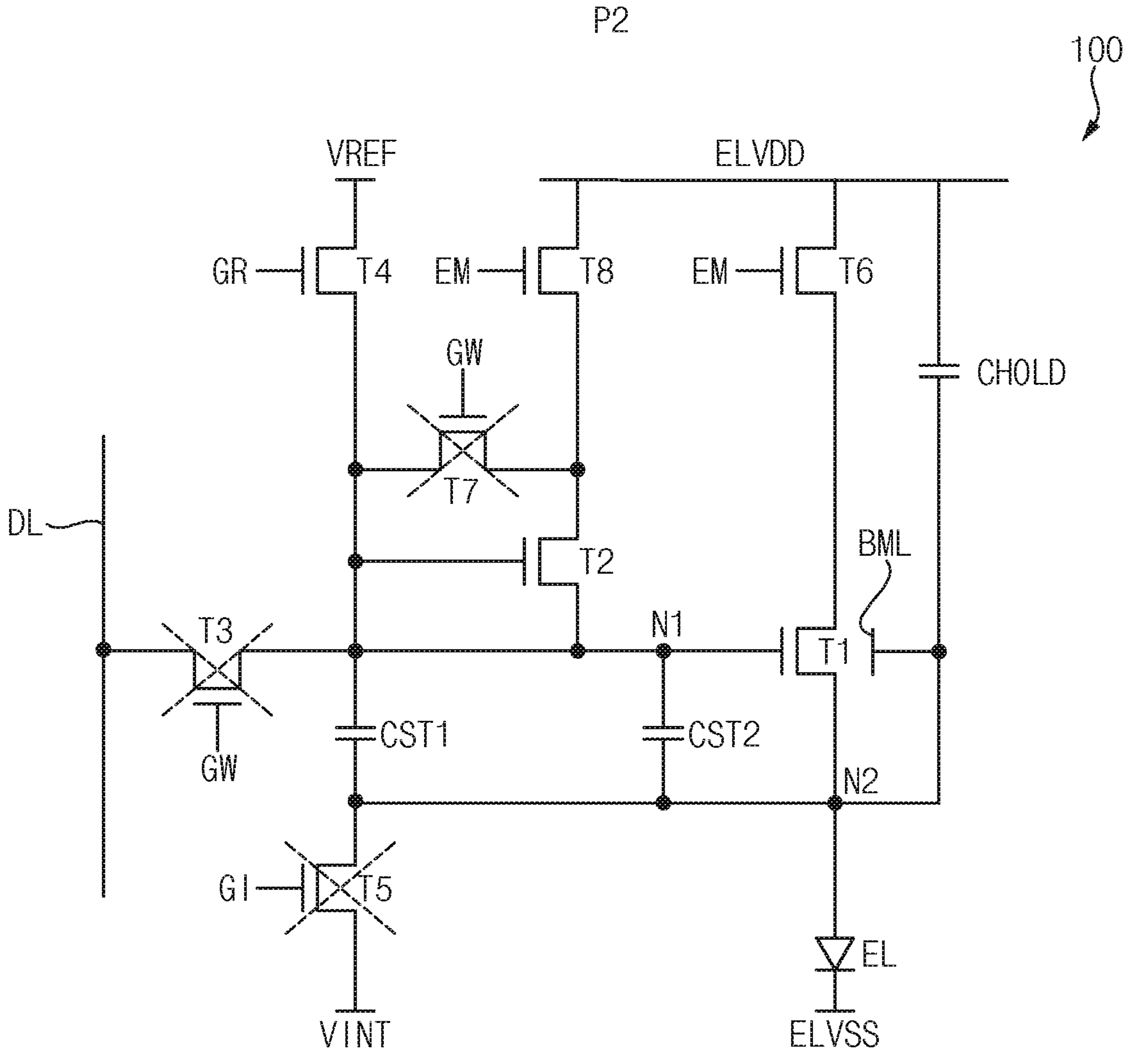
FIG. 4 is a schematic circuit diagram for describing an example of an operation of a pixel in a second period.
Figure 5:
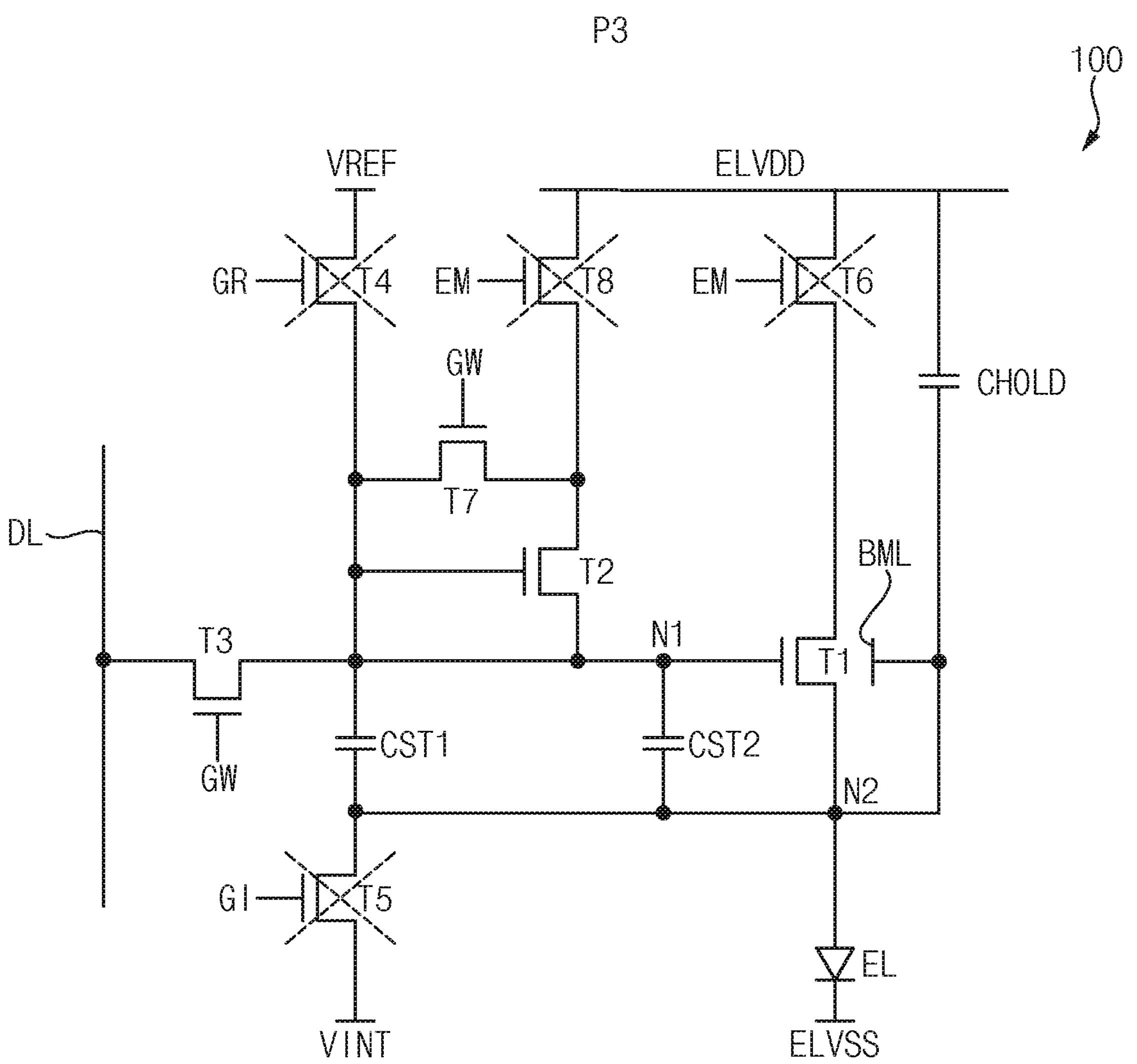
FIG. 5 is a schematic circuit diagram for describing an example of an operation of a pixel in a third period.
Figure 6:
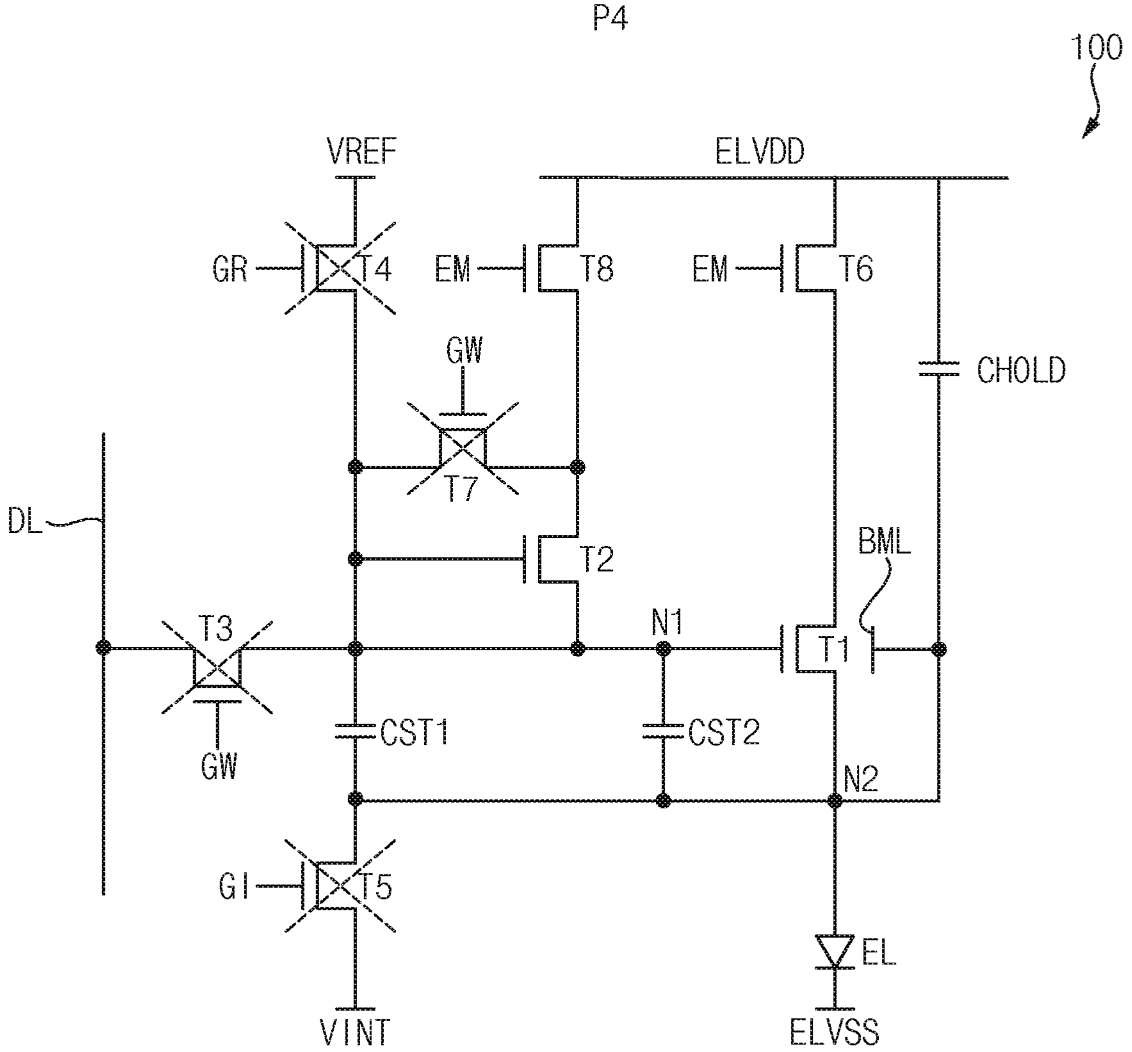
FIG. 6 is a schematic circuit diagram for describing an example of an operation of a pixel in a fourth period.

FIG. 2 is a timing diagram for describing an example of an operation of a pixel according to embodiments, FIG. 3 is a schematic circuit diagram for describing an example of an operation of a pixel in a first period, FIG. 4 is a schematic circuit diagram for describing an example of an operation of a pixel in a second period, FIG. 5 is a schematic circuit diagram for describing an example of an operation of a pixel in a third period, and FIG. 6 is a schematic circuit diagram for describing an example of an operation of a pixel in a fourth period.

Referring to FIGS. 1 and 2, a frame period for a display device including a pixel 100 may include a first period P1, a second period P2, a third period P3 and a fourth period P4.

In the first period P1, a first node N1 and a second node N2 may be initialized. Thus, the first period P1 may be referred to as an initialization period. As illustrated in FIGS. 2 and 3, in the first period P1, an emission signal EM and a writing signal GW may have an off-level (for example, a low level), and a reset signal GR and an initialization signal GI may have an on-level (for example, a high level). Third and seventh transistors T3 and T7 may be turned off in response to the writing signal GW having the off-level, and sixth and eighth transistors T6 and T8 may be turned off in response to the emission signal EM having the off-level. A fourth transistor T4 may be turned on in response to the reset signal GR having the on-level, and may apply a reference voltage VREF to the first node N1. A fifth transistor T5 may be turned on in response to the initialization signal GI having the on-level, and may apply an initialization voltage VINT to the second node N2. Accordingly, the first node N1 may be initialized based on the reference voltage VREF, and the second node N2 may be initialized based on the initialization voltage VINT.

In the second period P2, a threshold voltage of a first transistor T1 may be compensated. Thus, the second period P2 may be referred to as a compensation period. As illustrated in FIGS. 2 and 4, in the second period P2, the initialization signal GI and the writing signal GW may have the off-level, and the emission signal EM and the reset signal GR may have the on-level. The third and seventh transistors T3 and T7 may be turned off in response to the writing signal GW having the off-level, and the fifth transistor T5 may be turned off in response to the initialization signal GI having the off-level. The fourth transistor T4 may be turned on in response to the reset signal GR having the on-level, and may apply the reference voltage VREF to the first node N1. The sixth and eighth transistors T6 and T8 may be turned on in response to the emission signal EM having the on-level. If the reference voltage VREF is applied to the first node N1, or a gate of the first transistor T1, and the sixth transistor T6 is turned on, the first transistor T1 may have an on-condition, and may be turned on. Further, the first transistor T1 may be turned on until a voltage of the second node N2 becomes a voltage obtained by subtracting the threshold voltage of the first transistor T1 from the reference voltage VREF. Accordingly, in the second period P2, the voltage of the second node N2 may be saturated to the voltage obtained by subtracting the threshold voltage of the first transistor T1 from the reference voltage VREF, and the threshold voltage of the first transistor T1 may be stored between both ends of each of first and second storage capacitors CST1 and CST2.

In the third period P3, a data voltage of a data line DL may be written to the pixel 100, and/or a compensation operation for a second transistor T2 may be performed. Thus, the third period P3 may be referred to as a writing period or a writing and compensation period. As illustrated in FIGS. 2 and 5, in the third period P3, the emission signal EM, the reset signal GR, and the initialization signal GI may have the off-level, and the writing signal GW may have the on-level. The fourth transistor T4 may be turned off in response to the reset signal GR having the off-level, the fifth transistor T5 may be turned off in response to the initialization signal GI having the off-level, and the sixth and eighth transistors T6 and T8 may be turned off in response to the emission signal EM having the off-level. The third transistor T3 may be turned on in response to the writing signal GW having the on-level, and may apply the data voltage of the data line DL to the first node N1. Thus, the first and second storage capacitors CST1 and CST2 may store the data voltage at the first node N1, or at a first electrode of the first storage capacitor CST1 and a third electrode of the second storage capacitor CST2. Further, the seventh transistor T7 may be turned on in response to the writing signal GW having the on-level, and may diode-connect the second transistor T2. Thus, in the third period P3, the compensation operation for the second transistor T2 may be performed. At an end time point of the third period P3, or at an edge (for example, a falling edge) of the writing signal GW at which the writing signal GW is changed from the on-level (for example, the high level) to the off-level (for example, the low level), by a parasitic capacitor between a line of the writing signal GW and the first node N1, a kickback phenomenon where a voltage of the first node N1 may be changed (for example, decreased) by a kickback voltage may occur. However, in the pixel 100 according to embodiments, by the first and second storage capacitors CST1 and CST2 and the second transistor T2, the kickback voltage may be reduced.

In the fourth period P4, a light emitting element EL may emit light. Thus, the fourth period P4 may be referred to as an emission period. As illustrated in FIGS. 2 and 6, in the fourth period P4, the reset signal GR, the initialization signal GI and the writing signal GW have the off-level, and the emission signal EM may have the on-level. The fourth transistor T4 may be turned off in response to the reset signal GR having the off-level, the fifth transistor T5 may be turned off in response to the initialization signal GI having the off-level, and the third and seventh transistors T3 and T7 may be turned off in response to the writing signal GW having the off-level. The first transistor T1 may generate a driving current based on a voltage stored in the first and second storage capacitors CST1 and CST2. The sixth transistor T6 may be turned on in response to the emission signal EM having the on-level, and may form a path of the driving current from a line of a first power supply voltage ELVDD to a line of a second power supply voltage ELVSS. Thus, the light emitting element EL may emit light based on the driving current generated by the first transistor T1. The sixth transistor T6 may be turned on in response to the emission signal EM having the on-level, and may apply the first power supply voltage ELVDD to the second transistor T2.

The second transistor T2 receiving the first power voltage ELVDD may compensate the voltage of the first node N1 that is changed (for example, decreased) by the kickback phenomenon (for example, based on a leakage current, or the like).

Figure 7:
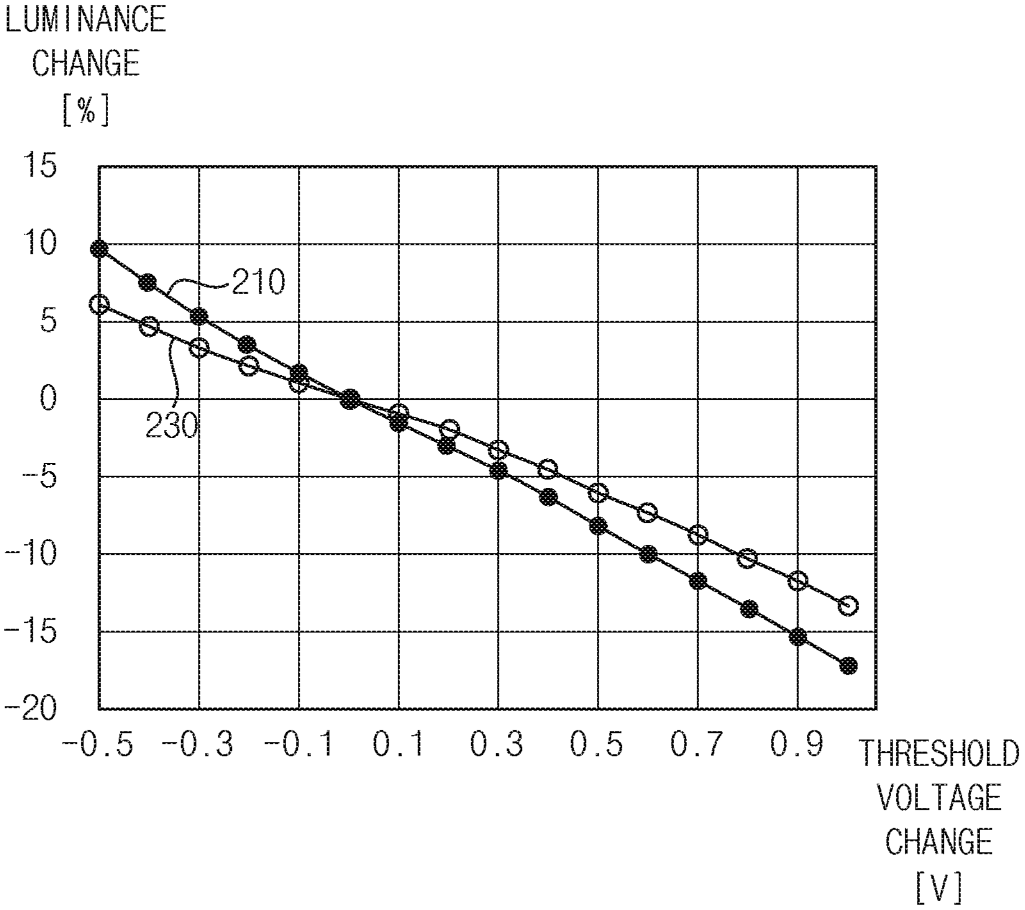
FIG. 7 is a diagram illustrating examples of a luminance change caused by a threshold voltage change.

FIG. 7 illustrates a luminance change 210 according to a threshold voltage change with respect to a pixel that may include only one storage capacitor and does not include the second transistor T2, and a luminance change 230 according to a threshold voltage change with respect to the pixel 100 according to embodiments. As illustrated in FIG. 7, in a case where a pixel may include only one storage capacitor and does not include the second transistor T2, the luminance difference 210 of the pixel according to the threshold voltage change of the first transistor T1 may be relatively great. However, in the pixel 100 according to embodiments, even if a threshold voltage of the first transistor T1 is changed, the luminance change 230 of the pixel 100 may be relatively small by the first and second storage capacitors CST1 and CST2 and the second transistor T2.

Figure 8:
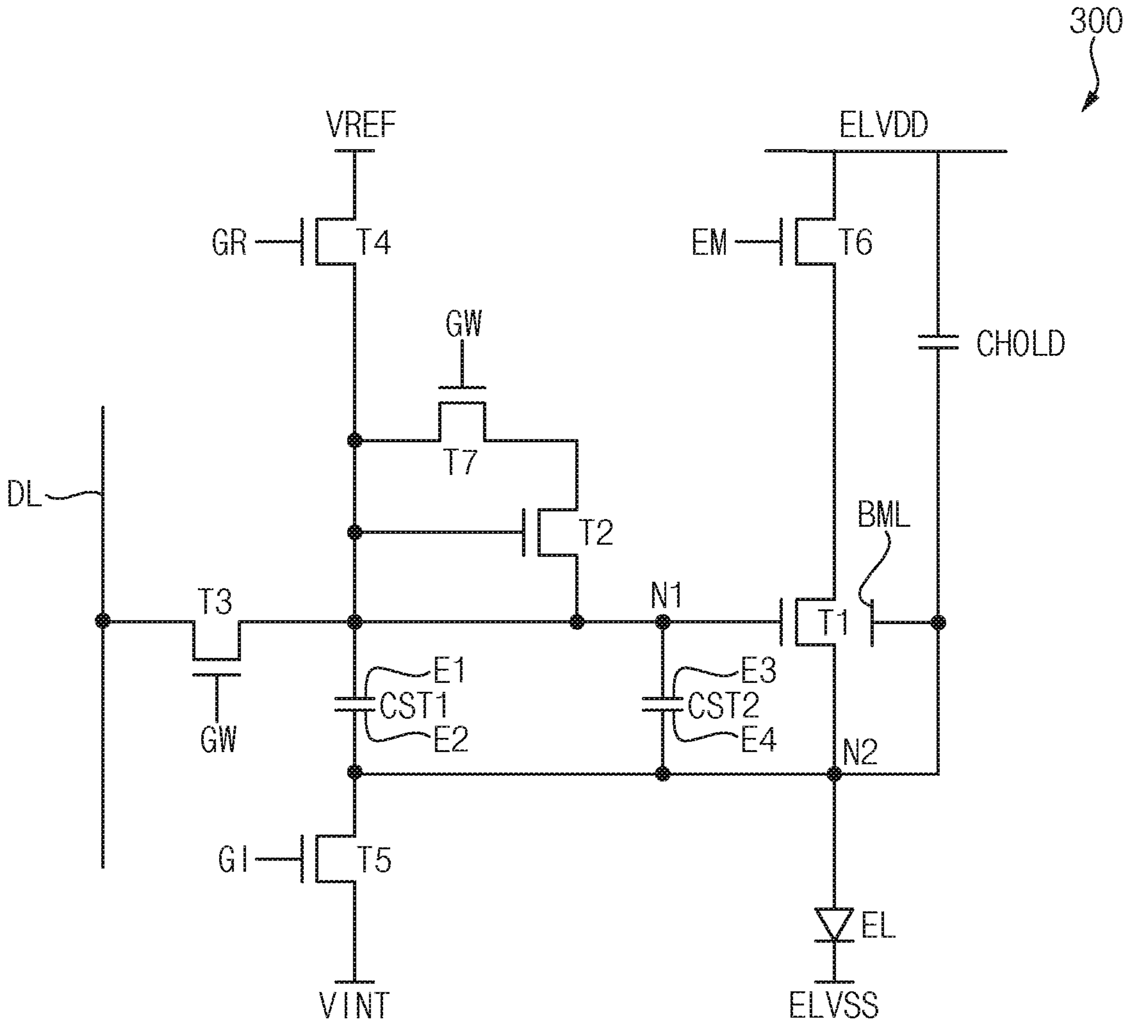
FIG. 8 is a schematic diagram of an equivalent circuit of a pixel of a display device according to embodiments.

FIG. 8 is a schematic diagram of an equivalent circuit of a pixel of a display device according to embodiments.

Referring to FIG. 8, a pixel 300 according to embodiments may include a first transistor T1, a first storage capacitor CST1, a second storage capacitor CST2, a holding capacitor CHOLD, a second transistor T2, a third transistor T3, a fourth transistor T4, a fifth transistor T5, a sixth transistor T6, a seventh transistor T7 and a light emitting element EL. The pixel 300 of FIG. 8 may have substantially the same configuration and substantially the same operation as a pixel 100 of FIG. 1, except that the pixel 300 may not include an eighth transistor T8 illustrated in FIG. 1.

Figure 9:
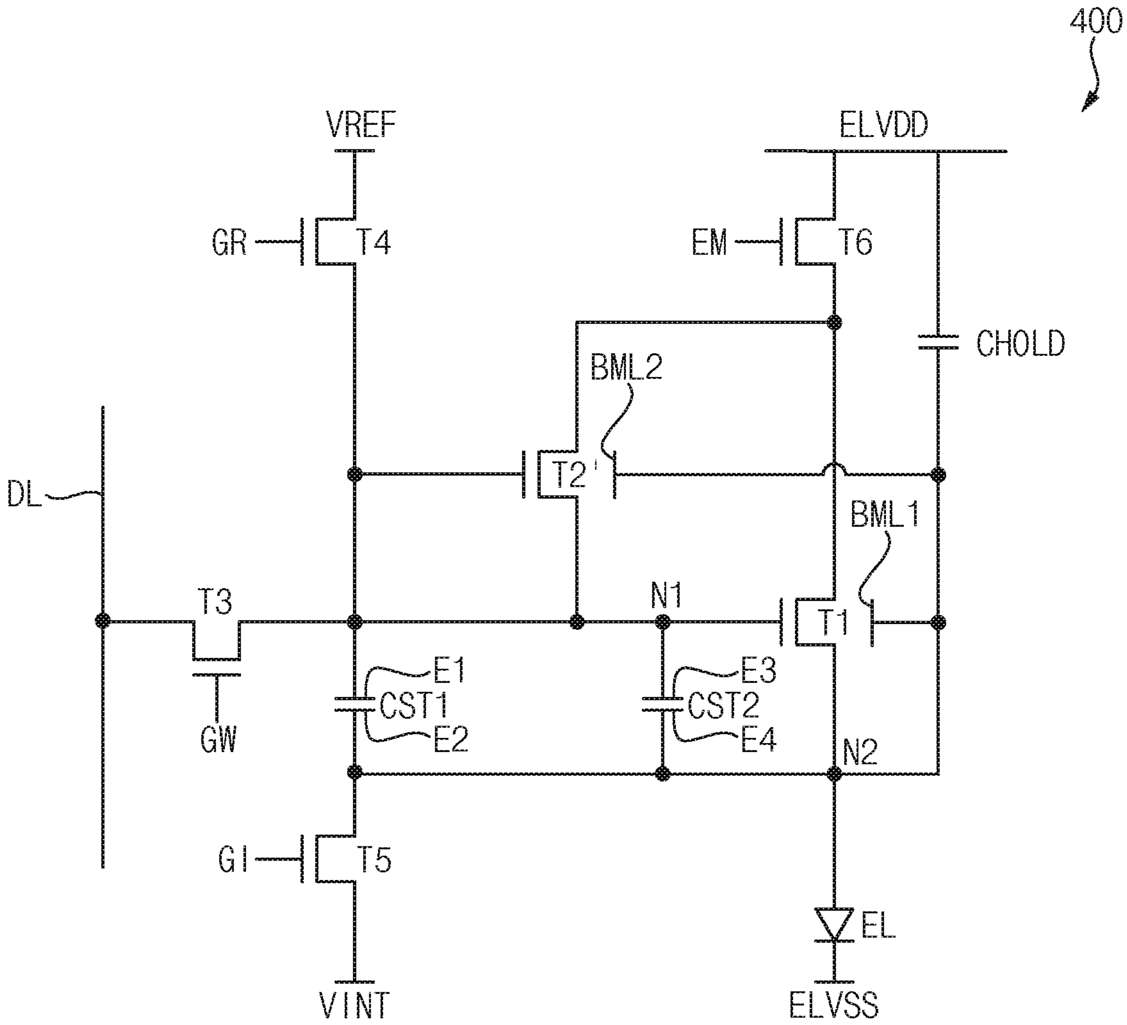
FIG. 9 is a schematic diagram of an equivalent circuit of a pixel of a display device according to embodiments.

FIG. 9 is a schematic diagram of an equivalent circuit of a pixel of a display device according to embodiments.

Referring to FIG. 9, a pixel 300 according to embodiments may include a first transistor T1, a first storage capacitor CST1, a second storage capacitor CST2, a holding capacitor CHOLD, a second transistor T2', a third transistor T3, a fourth transistor T4, a fifth transistor T5, a sixth transistor T6 and a light emitting element EL. The pixel 300 of FIG. 8 may have substantially the same configuration and substantially the same operation as a pixel 100 of FIG. 1, except that the pixel 400 may not include seventh and eighth transistors T7 and T8 illustrated in FIG. 1, and a first terminal (for example, a drain) of the second transistor T2' is coupled to the sixth transistor T6.

The second transistor T2' may include a gate coupled to a first node N1, a first terminal coupled to a second terminal of the sixth transistor T6, and a second terminal coupled to the first node N1. In an embodiment, each of the first and second transistors T1 and T2' may have a double gate structure. Thus, the first transistor T1 may include a bottom gate BML1 located or disposed under or below an active layer of the first transistor T1 and coupled to a second node N2, and the second transistor T2' may include a bottom gate BML2 located or disposed under or below an active layer of the second transistor T2' and coupled to the second node N2. As in the first transistor T1, a compensation operation for the second transistor T2' also may be performed using capacitors CST1, CST2 and CHOLD.

Figure 10:
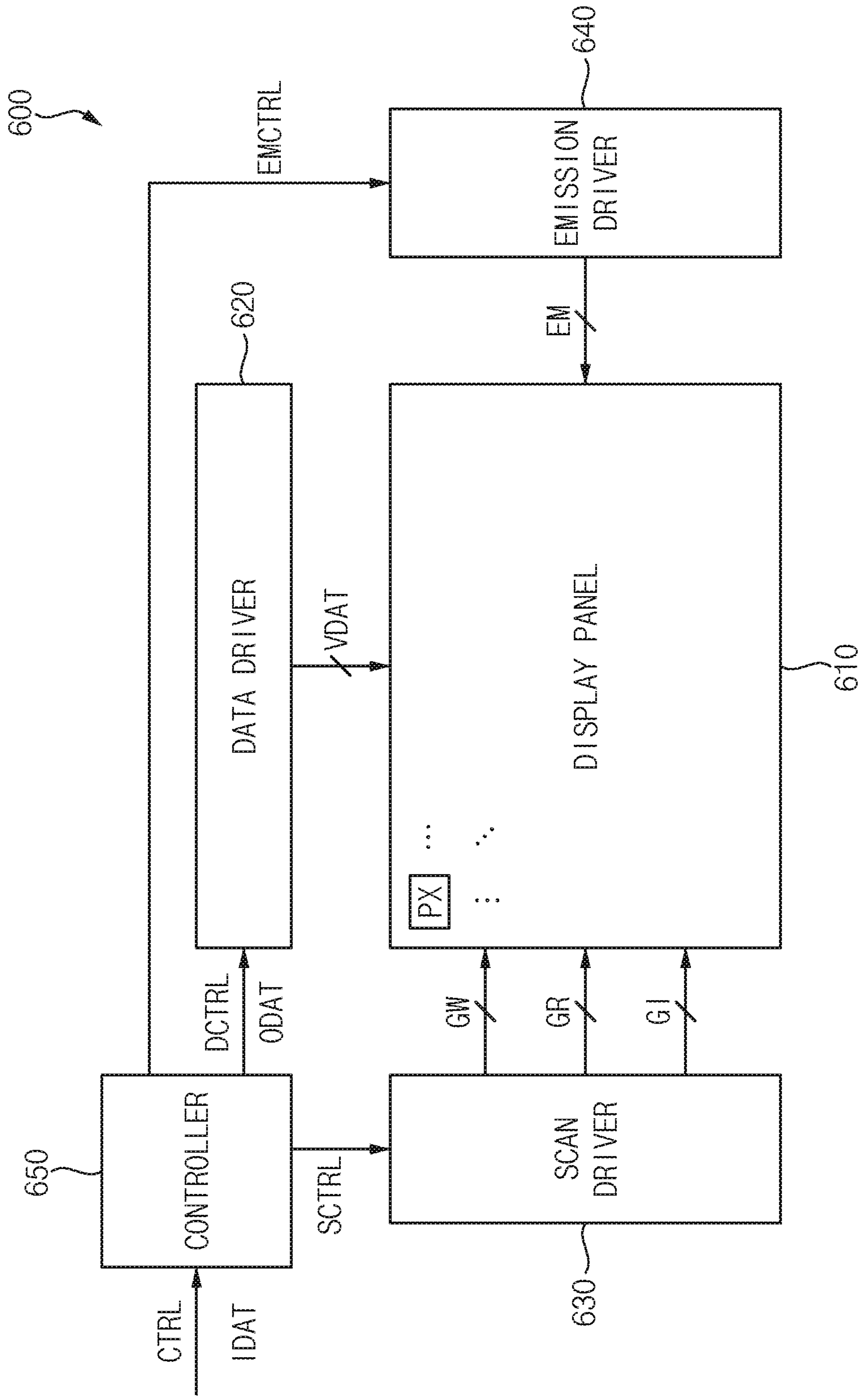
FIG. 10 is a block diagram illustrating a display device according to embodiments.

FIG. 10 is a block diagram illustrating a display device according to embodiments.

Referring to FIG. 10, a display device 600 according to embodiments may include a display panel 610, a data driver 620, a scan driver 630, an emission driver 640 and a controller 650.

The display panel 610 may include pixels PX. According to embodiments, each pixel PX of the display panel 610 may be a pixel 100 of FIG. 1, a pixel 300 of FIG. 8, a pixel 400 of FIG. 9, or a pixel having a similar structure. Each pixel PX may include first and second storage capacitors coupled (or connected) in parallel between a first node and a second node, and a second transistor having a gate coupled (or connected) to the first node. In the display device 600 including the pixel PX, a kickback phenomenon may be reduced, and a luminance change caused by a threshold voltage change may be reduced.

The data driver 620 may provide data voltages VDAT to the pixels PX based on output image data ODAT and a data control signal DCTRL received from the controller 650. In an embodiment, the data control signal DCTRL may include, but not limited to, an output data enable signal, a horizontal start signal and a load signal. In an embodiment, the data driver 620 and the controller 650 may be a single integrated circuit, and the single integrated circuit may be referred to as a timing controller embedded data driver (TED) integrated circuit. In other embodiments, the data driver 620 and the controller 650 may be separate integrated circuits.

The scan driver 630 may provide writing signals GW, reset signals GR and initialization signals GI to the pixels PX based on a scan control signal SCTRL received from the controller 650. In an embodiment, the scan control signal SCTRL may include, but not limited to, a scan start signal and a scan clock signal. In an embodiment, the scan driver 630 may be integrated or formed in a peripheral region (and/or a display region) of the display panel 610. In other embodiments, the scan driver 630 may be one or more integrated circuits.

The emission driver 640 may provide emission signals EM to the pixels PX based on an emission control signal EMCTRL received from the controller 650. The emission control signal EMCTRL may include, but not limited to, an emission start signal and an emission clock signal. In an embodiment, the emission driver 640 may be integrated or formed in the peripheral region (and/or the display region) of the display panel 610. In other embodiments, the emission driver 640 may be one or more integrated circuits.

The controller 650 (for example, a timing controller) may receive input image data IDAT and a control signal CTRL from an external host processor (for example, a graphics processing unit (GPU), an application processor (AP) or a graphics card). In an embodiment, the control signal CTRL may include, but not limited to, a vertical synchronization signal, a horizontal synchronization signal, an input data enable signal, a master clock signal, etc. The controller 650 may generate the output image data ODAT, the data control signal DCTRL, the scan control signal SCTRL and the emission control signal EMCTRL based on the input image data IDAT and the control signal CTRL. The controller 650 may control an operation of the data driver 620 by providing the output image data ODAT and the data control signal DCTRL to the data driver 620, may control an operation of the scan driver 630 by providing the scan control signal SCTRL to the scan driver 630, and may control an operation of the emission driver 640 by providing the emission control signal EMCTRL to the emission driver 640.

Figure 11:
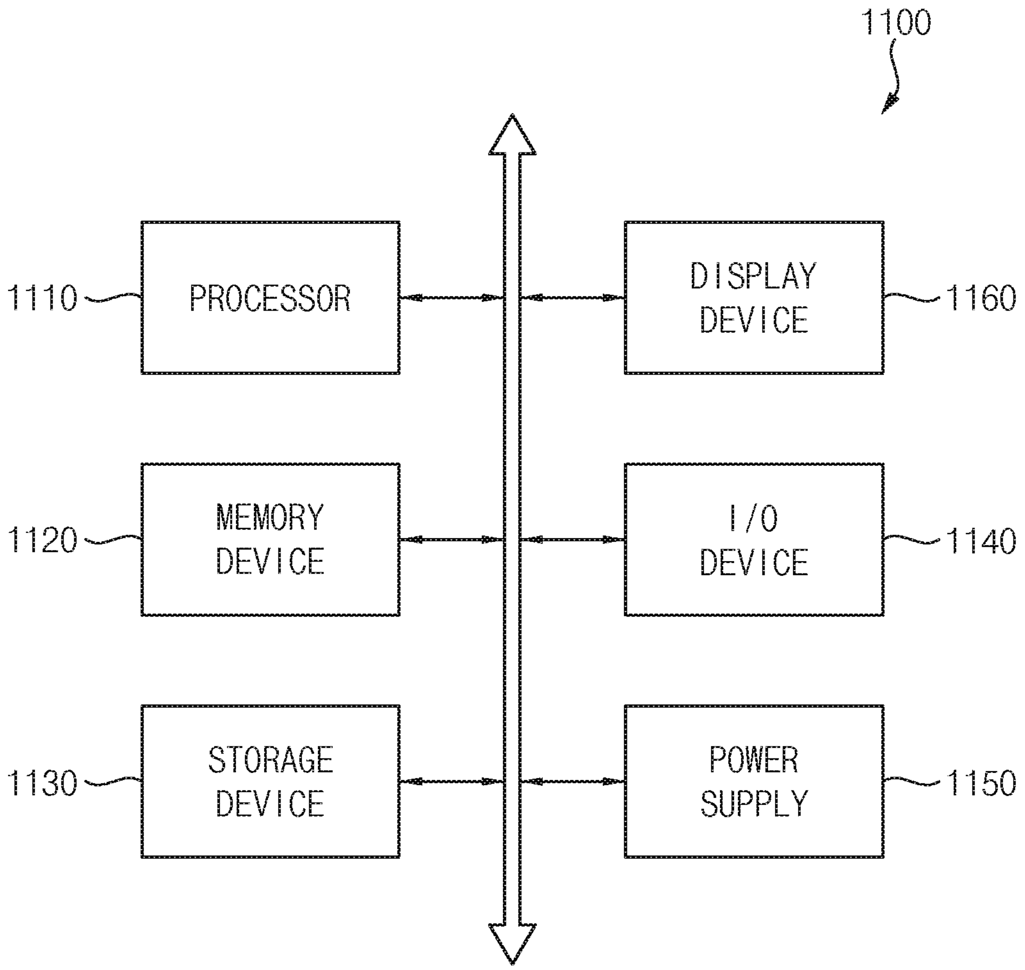
FIG. 11 is a block diagram illustrating an electronic device including a display device according to embodiments.

FIG. 11 is a block diagram illustrating an electronic device including a display device according to embodiments.

Referring to FIG. 11, an electronic device 1100 may include a processor 1110, a memory device 1120, a storage device 1130, an input/output (I/O) device 1140, a power supply 1150, and a display device 1160. The electronic device 1100 may further include ports for communicating with a video card, a sound card, a memory card, a universal serial bus (USB) device, other electric devices, etc.

The processor 1110 may perform various computing functions or tasks. The processor 1110 may be an application processor (AP), a micro-processor, a central processing unit (CPU), etc. The processor 1110 may be coupled to other components via an address bus, a control bus, a data bus, etc. Further, in an embodiment, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, each pixel may include first and second storage capacitors coupled (or connected) in parallel between a first node and a second node, and a second transistor having a gate coupled (or connected) to the first node. In the display device 1160 including the pixel, a kickback phenomenon may be reduced, and a luminance change caused by a threshold voltage change may be reduced.

The disclosure may be applied to any display device 1160, and any electronic device 1100 including the display device 1160. For example, the disclosure may be applied to a smart phone, a wearable electronic device, a tablet computer, a mobile phone, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of embodiments and is not to be construed as limiting thereof. Although embodiments have been described, those skilled in the art will readily appreciate that many modifications are possible in the embodiments without materially departing from the novel teachings and advantages of the disclosure. Accordingly, all such modifications are intended to be included within the scope of the disclosure and as defined in the claims. Therefore, it is to be understood that the foregoing is illustrative of various embodiments and is not to be construed as limited to the disclosed embodiments, and that modifications to the disclosed embodiments, as well as other embodiments, are intended to be included and within the scope of the appended claims.

What is claimed is:

1. A pixel of a display device, the pixel comprising:

a first transistor including a gate electrically connected to a first node, a first terminal, and a second terminal electrically connected to a second node;

a first storage capacitor electrically connected between the first node and the second node;

a second storage capacitor electrically connected between the first node and the second node;

a holding capacitor electrically connected between a line of a first power supply voltage and the second node;

a second transistor including a gate electrically connected to the first node, a first terminal, and a second terminal electrically connected to the first node;

a third transistor including a gate receiving a writing signal, a first terminal electrically connected to a data line, and a second terminal electrically connected to the first node;

a fourth transistor including a gate receiving a reset signal, a first terminal electrically connected to a line of a reference voltage, and a second terminal electrically connected to the first node;

a fifth transistor including a gate receiving an initialization signal, a first terminal electrically connected to the second node, and a second terminal electrically connected to a line of an initialization voltage;

a sixth transistor including a gate receiving an emission signal, a first terminal electrically connected to the line of the first power supply voltage, and a second terminal electrically connected to the first terminal of the first transistor; and a light emitting element including an anode electrically connected to the second node, and a cathode electrically connected to a line of a second power supply voltage.

2. The pixel of claim 1, wherein the first storage capacitor includes a first electrode electrically connected to the first node, and a second electrode electrically connected to the second node, the second storage capacitor includes a third electrode electrically connected to the first node, and a fourth electrode electrically connected to the second node, and the third electrode is different from the first electrode, and the fourth electrode is different from the second electrode.

3. The pixel of claim 1, wherein the first transistor further includes a bottom gate electrically connected to the second node.

4. The pixel of claim 1, further comprising:

a seventh transistor including a gate receiving the writing signal, a first terminal electrically connected to the first node, and a second terminal electrically connected to the first terminal of the second transistor.

5. The pixel of claim 1, further comprising:

an eighth transistor including a gate receiving the emission signal, a first terminal electrically connected to the line of the first power supply voltage, and a second terminal electrically connected to the first terminal of the second transistor.

6. The pixel of claim 1, wherein the first terminal of the second transistor is electrically connected to the second terminal of the sixth transistor.

7. The pixel of claim 1, wherein the second transistor further includes a bottom gate electrically connected to the second node.

8. The pixel of claim 1, wherein the first transistor, the second transistor, the third transistor, the fourth transistor, the fifth transistor, and the sixth transistor are n-type metal oxide semiconductor (NMOS) transistors.

9. The pixel of claim 1, wherein the first transistor, the second transistor, the third transistor, the fourth transistor, the fifth transistor, and the sixth transistor are oxide transistors.

10. The pixel of claim 1, wherein a frame period for the display device includes:

a first period in which the reset signal and the initialization signal have an on-level, and the emission signal and the writing signal have an off-level;

a second period in which the emission signal and the reset signal have the on-level, and the initialization signal and the writing signal have the off-level;

a third period in which the writing signal has the on-level, and the emission signal, the reset signal and the initialization signal have the off-level; and a fourth period in which the emission signal has the on-level, and, the reset signal, the initialization signal and the writing signal have the off-level.

11. A display device comprising:

a display panel including pixels;

a data driver that provides a data voltage to each of the pixels;

a scan driver that provides a writing signal, a reset signal and an initialization signal to each of the pixels;

an emission driver that provides an emission signal to each of the pixels; and a controller that controls the data driver, the scan driver and the emission driver, wherein each of the pixels includes:

a first transistor including a gate electrically connected to a first node, a first terminal, and a second terminal electrically connected to a second node;

a first storage capacitor electrically connected between the first node and the second node;

a second storage capacitor electrically connected between the first node and the second node;

a holding capacitor electrically connected between a line of a first power supply voltage and the second node;

a second transistor including a gate electrically connected to the first node, a first terminal, and a second terminal electrically connected to the first node;

a third transistor including a gate receiving the writing signal, a first terminal electrically connected to a data line, and a second terminal electrically connected to the first node;

a fourth transistor including a gate receiving the reset signal, a first terminal electrically connected to a line of a reference voltage, and a second terminal electrically connected to the first node;

a fifth transistor including a gate receiving the initialization signal, a first terminal electrically connected to the second node, and a second terminal electrically connected to a line of an initialization voltage;

a sixth transistor including a gate receiving the emission signal, a first terminal electrically connected to the line of the first power supply voltage, and a second terminal electrically connected to the first terminal of the first transistor; and a light emitting element including an anode electrically connected to the second node, and a cathode electrically connected to a line of a second power supply voltage.

12. The display device of claim 11, wherein the first storage capacitor includes a first electrode electrically connected to the first node, and a second electrode electrically connected to the second node, the second storage capacitor includes a third electrode electrically connected to the first node, and a fourth electrode electrically connected to the second node, and the third electrode is different from the first electrode, and the fourth electrode is different from the second electrode.

13. The display device of claim 11, wherein the first transistor further includes a bottom gate electrically connected to the second node.

14. The display device of claim 11, wherein each of the pixels further includes:

a seventh transistor including a gate receiving the writing signal;

a first terminal electrically connected to the first node; and a second terminal electrically connected to the first terminal of the second transistor.

15. The display device of claim 11, wherein each of the pixels further includes:

an eighth transistor including a gate receiving the emission signal;

a first terminal electrically connected to the line of the first power supply voltage; and a second terminal electrically connected to the first terminal of the second transistor.

16. The display device of claim 11, wherein the first terminal of the second transistor is electrically connected to the second terminal of the sixth transistor.

17. The display device of claim 11, wherein the second transistor further includes a bottom gate electrically connected to the second node.

18. The display device of claim 11, wherein the first transistor, the second transistor, the third transistor, the fourth transistor, the fifth transistor, and the sixth transistor are n-type metal oxide semiconductor (NMOS) transistors.

19. The display device of claim 11, wherein the first transistor, the second transistor, the third transistor, the fourth transistor, the fifth transistor, and the sixth transistor are oxide transistors.

20. The display device of claim 11, wherein a frame period for the display device includes:

a first period in which the reset signal and the initialization signal have an on-level, and the emission signal and the writing signal have an off-level;

a second period in which the emission signal and the reset signal have the on-level, and the initialization signal and the writing signal have the off-level;

a third period in which the writing signal has the on-level, and the emission signal, the reset signal and the initialization signal have the off-level; and a fourth period in which the emission signal has the on-level, and, the reset signal, the initialization signal and the writing signal have the off-level.

* * * * *